US008775938B2

(12) United States Patent
Rosser et al.

(10) Patent No.: US 8,775,938 B2
(45) Date of Patent: Jul. 8, 2014

(54) PRESENTATION OF USER INTERFACE CONTENT VIA MEDIA PLAYER

(75) Inventors: Peter D Rosser, Renton, WA (US); William H Linzbach, Sammamish, WA (US); Mark Schwesinger, Bellevue, WA (US); Suzan Marashi, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 973 days.

(21) Appl. No.: 11/875,780

(22) Filed: Oct. 19, 2007

(65) Prior Publication Data

US 2009/0106659 A1   Apr. 23, 2009

(51) Int. Cl.
*G06F 3/00* (2006.01)
*G06F 3/048* (2013.01)

(52) U.S. Cl.
USPC ........... 715/730; 715/744; 715/810; 715/828; 725/38; 725/61

(58) Field of Classification Search
USPC ................ 715/730–733, 744–747, 764–765, 715/810–811, 828; 725/38, 59–61, 725/135–142
See application file for complete search history.

(56) References Cited

U.S. PATENT DOCUMENTS

| | | | |
|---|---|---|---|
| 5,610,665 A | 3/1997 | Berman | |
| 5,774,172 A | 6/1998 | Kapell et al. | |
| 6,260,192 B1* | 7/2001 | Rosin et al. | 725/39 |
| 6,381,362 B1 | 4/2002 | Deshpande et al. | |
| 6,486,914 B1 | 11/2002 | Anderson | |
| 7,010,492 B1 | 3/2006 | Bassett et al. | |
| 7,197,715 B1 | 3/2007 | Valeria | |
| 7,281,199 B1* | 10/2007 | Nicol et al. | 715/203 |
| 2002/0078144 A1* | 6/2002 | Lamkin et al. | 709/203 |
| 2003/0030652 A1 | 2/2003 | Billmaier et al. | |
| 2003/0084443 A1 | 5/2003 | Laughlin et al. | |
| 2003/0145331 A1* | 7/2003 | Escobar et al. | 725/37 |
| 2004/0002049 A1* | 1/2004 | Beavers et al. | 434/350 |
| 2004/0003406 A1* | 1/2004 | Billmaier | 725/60 |
| 2004/0075670 A1 | 4/2004 | Bezine et al. | |
| 2005/0175324 A1 | 8/2005 | Gravina et al. | |
| 2005/0264583 A1 | 12/2005 | Wilkins | |
| 2006/0139373 A1 | 6/2006 | Sloo et al. | |
| 2007/0028270 A1 | 2/2007 | Ostojic et al. | |
| 2008/0163283 A1* | 7/2008 | Tan et al. | 725/20 |

OTHER PUBLICATIONS

Chorianopoulos, et al. "Affective Usability Evaluation for an Interactive Music Television Channel", ACM Computers in Entertainment, vol. 2, No. 3, Jul. 2004, ACM, 2004,pp. 1-11.
"Multi-platform e-Publishing for Leisure and Interactive Sports Advertising", 2001, pp. 1-6.
Cherry, "Adaptive Advertising: Definitions, Scenarios and Standards", Jan. 1, 2007, Access Intelligence LLC, pp. 11.

* cited by examiner

*Primary Examiner* — Weilun Lo
*Assistant Examiner* — Dino Kujundzic
(74) *Attorney, Agent, or Firm* — Micah Goldsmith; Glen Johnson; Micky Minhas

(57) ABSTRACT

The presentation of user interface content via a media player is disclosed. In one embodiment, a media player detects a triggering event, and, upon detecting the triggering event, requests and receives a user interface content slide deck comprising one or more user interface content slides. The media player then retrieves user interface content for a slide in the slide deck, and displays the user interface content for the slide in the slide deck to a user along with media content.

16 Claims, 4 Drawing Sheets

PRESENTATION OF USER INTERFACE CONTENT VIA MEDIA PLAYER

BACKGROUND

Media players may be configured to allow users to play and manage different types of media via a single device. For example, various media players may allow a user to watch movies, television programs, other audio/video content, play music, view photos, and display or play any other suitable media content from any of a variety of sources. Sources for such media content include, but are not limited to, terrestrial broadcast television and radio, cable broadcast television and radio, satellite television and radio, wireless and wired computer networks, local and remote storage devices, compact disc drives, digital video disk drives, portable storage devices such as solid state memory devices and portable drives, etc.

Many media players utilize a visual user interface to allow a user to interact with and control the media player. A media player user interface also may be configured to display content related to a currently playing media item. For example, a title of a currently playing movie or television show may be displayed on a user interface. Such user interface content may be streamed from a media source along with media content, or may be periodically downloaded and stored local to the media player. Regardless of the method used to deliver user interface content, it may be difficult to display various types of content, and/or to dynamically update or modify user interface content, with some media player user interface systems.

SUMMARY

Accordingly, the presentation of user interface content via a media player is disclosed. In one disclosed embodiment, a media player detects a triggering event, and, upon detecting the triggering event, requests and receives a user interface content slide deck comprising one or more user interface content slides. The media player then retrieves user interface content for a slide in the slide deck, and displays the user interface content for the slide in the slide deck to a user along with media content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
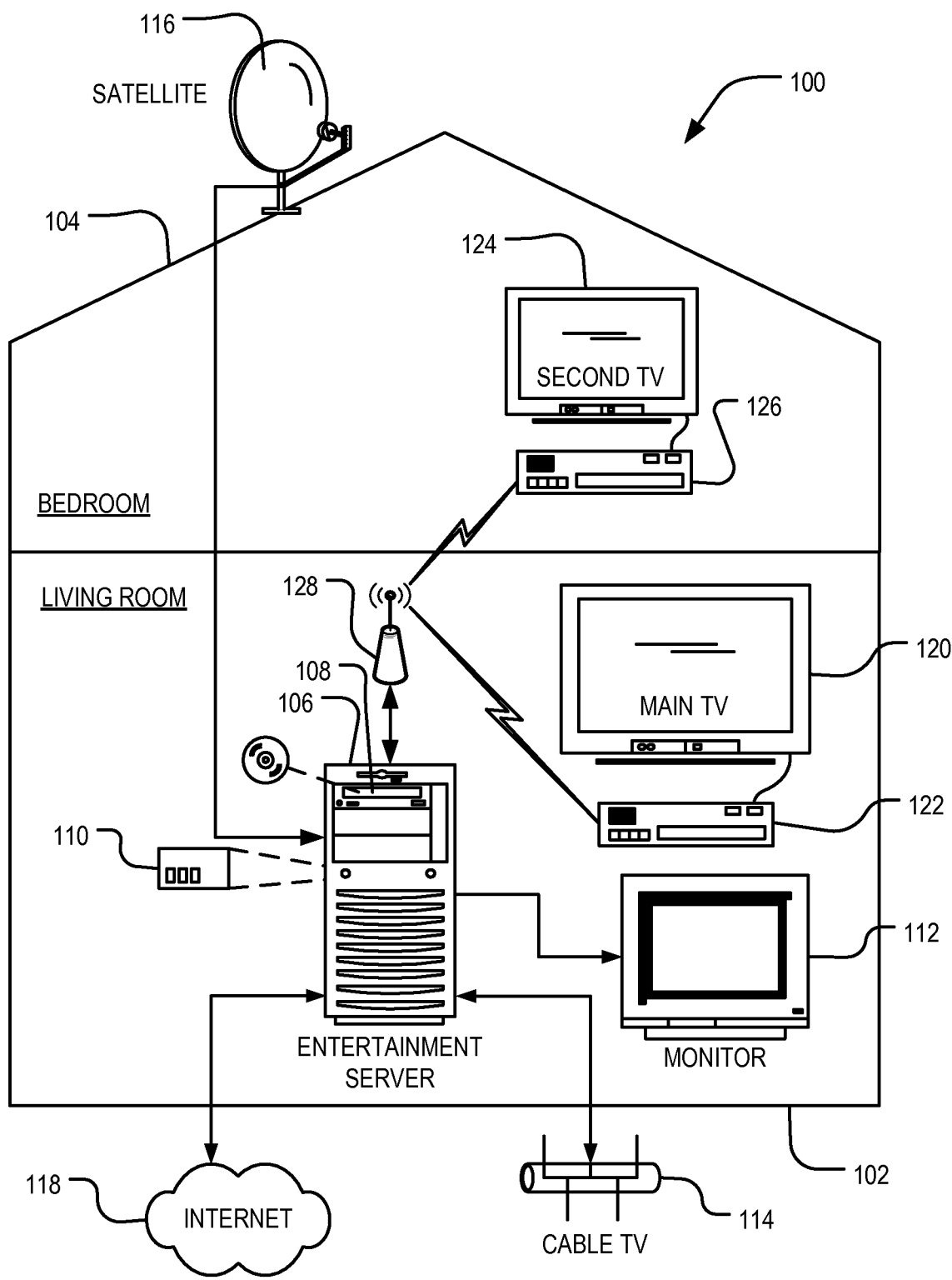
FIG. 1 shows an example of an embodiment of a home media environment.

Prior to discussing the presentation of user interface content via a media player, one example of a suitable media system environment is described. FIG. 1 depicts an example home entertainment environment 100 including a living room 102 and a bedroom 104. Central to the home entertainment environment 100 is a media server 106, in this implementation situated in the living room 102, but which could be located anywhere within the house. In one implementation, the media server 106 is a conventional personal computer (PC) configured to run a multimedia software package, for example, the Windows Vista Ultimate operating system with a media player such as Windows Media Center (available from Microsoft Corporation of Redmond, Wash.). In such a configuration, the media server 106 is able to integrate full computing functionality with a complete home entertainment system into a single PC. For example, a user can watch television (TV) in one graphical window of a video monitor, while sending e-mail or working on a spreadsheet in another graphical window on the same monitor. In addition, the media server 106 may also include other features or components, for example: a digital video recorder (DVR) to capture live TV shows for future viewing or to record the future broadcast of a single program or series; a compact disc (CD) or digital video disc (DVD) drive 108 for disc media playback; a memory drive 110 for integrated storage of and access to a user's recorded content, such as TV shows, songs, pictures, and home videos; and an electronic program guide (EPG) (not shown in FIG. 1).

Instead of a conventional PC, the media server 106 may comprise a variety of other devices capable of storing and distributing media content including, for example, a notebook or portable computer, a tablet PC, a workstation, a mainframe computer, a server, an Internet appliance, or combinations thereof. The media server 106 may also be a set-top box capable of delivering media content to a computer where it may be streamed, or the set-top box itself could stream the media content. As the media server 106 may be a full function computer running an operating system, the user may also have the option to run standard computer programs (e.g., word processing and spreadsheets), send and receive e-mails, browse the Internet, or perform other common functions.

In addition to storing media content, the media server 106 may be connected with a variety of media sources, for example, a cable connection 114, a satellite receiver 116, an antenna (not shown for the sake of graphic clarity), and/or a network such as the Internet 118. A user may thus control a live stream of media content (e.g., TV content) received, for example, via the cable connection 114, the satellite receiver 116, antenna, or other suitable source.

The home environment 100 may also include one or more network devices functioning as media receivers 122, 126 placed in communication with the media server 106 through a network 128, for example, a local area network (LAN). In an example embodiment, each media receiver 122, 126 may be a Media Center Extender device, for example, an Xbox 360™ (Microsoft Corporation, Redmond, Wash.). The media receivers 122, 126 may also be implemented as any of a variety of conventional media rendering or computing devices, including, for example, a set-top box, a television, a video gaming console, a desktop PC, a notebook or portable computer, a workstation, a mainframe computer, an Internet appliance, a handheld PC, a cellular telephone or other wireless communications device, a personal digital assistant (PDA), or combinations thereof.

The network 128 may comprise a wired and/or wireless network, for example, cable, Ethernet, WiFi, a wireless access point (WAP), or any other electronic coupling means, including the Internet. The network 128 may enable communication between the media server 106, the media receivers 122, 126, and any other connected device through packetbased communication protocols, such as Transmission Control Protocol (TCP), Internet Protocol (IP), Real-time Transport Protocol (RTP), Real-time Transport Control Protocol (RTCP), and User Datagram Protocol (UDP). Communications may be transmitted directly between devices over a LAN, or they may be carried over a wide area network (WAN), for example, the Internet 118.

One or more video display devices, for example a main TV 120 in the living room 102, a secondary TV 124 in the bedroom 104, and a video monitor 112 may be situated throughout the home environment 100. These video display devices may be connected with the media server 106 via the network 128 either directly or via the media receivers 122, 126. As shown in the example of FIG. 1, the main TV 120 and the secondary TV 124 may be coupled to the media receivers 122, 126 through conventional cables. The video monitor 112 may be coupled with the media server 106 directly via a video cable. The media server 106 and media receivers 122, 126 may also or alternatively be coupled with any of a variety of video and audio presentation devices. Media content including TV content may thus be supplied to each of the video monitors 112, 120, 124 over the home network 128 from the media server 106 situated in the living room 104.

While FIG. 1 shows an example home environment for a media system, it will be appreciated that the embodiments disclosed herein may be used in any suitable environment, including but not limited to home and office environments, and may be implemented in any suitable device or combination of devices.

A media player on media server 106, media receivers 122, 126, or other component in a media system environment, may be configured to display a user interface to a user to allow a user to control and interact with the media player. The term "media player" as used herein refers to any device(s), application(s) and/or combination(s) thereof (including but not limited to those shown in FIG. 1) that allow one or more types of media to be viewed and/or played by a user.

Figure 2:
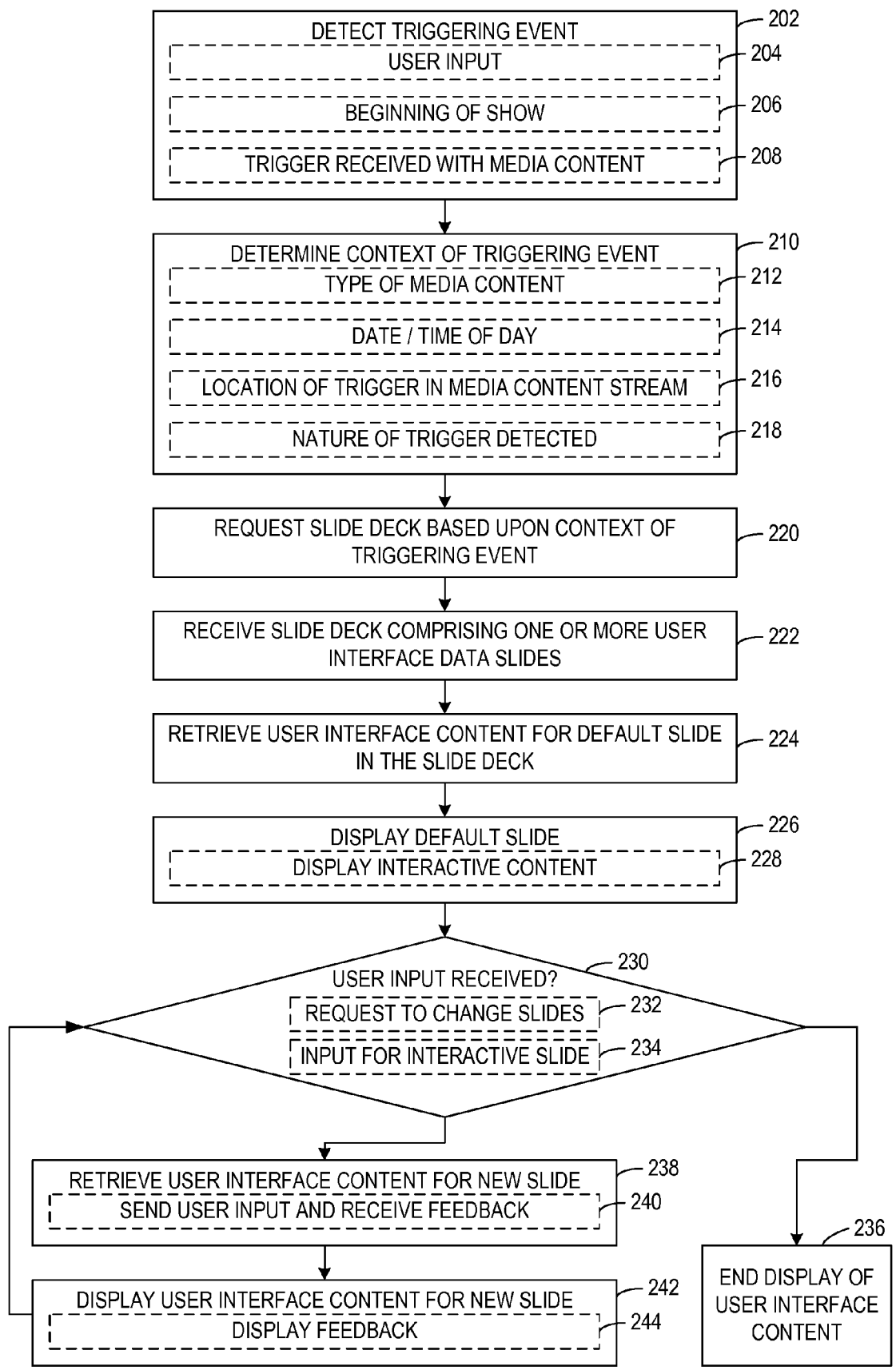
FIG. 2 shows a process flow depicting an embodiment of a method for presenting user interface content via a media player.

FIG. 2 illustrates a method 200 of presenting user interface content via a media player. Method 200 first comprises, at 202, detecting a triggering event. A triggering event is any event that triggers the media player to display a user interface. For example, a media player may be triggered to display a user interface upon receipt of a user input (for example, a user selecting a remote control key such as a "<", ">", "enter", or other command), as shown at 204. Likewise, the media player may be triggered to display a user interface upon the beginning of playback of a new show or other media content item, as shown at 206; upon receiving a trigger embedded in a media stream (i.e. "in band") or otherwise sent with a media stream (i.e. "out of band") by a media source during transmission of the media stream, as shown at 208; or upon the occurrence of any other suitable triggering event. It will be appreciated that these examples of triggering events are described for the purpose of illustration, and are not intended to be limiting in any manner.

Upon detecting the triggering event, a context of the triggering event is determined at 210. The context of the triggering event may include any suitable information about the triggering event that may be used to assemble or gather user interface content suitable for display in connection with the triggering event. For example, as indicated at 212, the context may include information regarding the type of media content being played by the media player and/or an identity of the media content. This information may then be used to determine what types of content to gather for presentation as user interface content in connection with a user request for information about the media content. As a specific example, if it is determined that the media content is a television show, then this context may be used to search for information relevant to the show.

The context may include other information as well. For example, as indicated at 214, the context may include information regarding the time of day, date, or other such information that is independent of the identity or type of media content being played. This may allow, for example, the presentation of user interface content that is related to or sensitive to a current time and/or date. Further, as indicated at 216, the context may include the location in a media content stream at which the trigger occurs. This may allow the presentation of user interface content specific to that portion of the media content. Additionally, the context may include information about the nature of the trigger detected, as indicated at 218. For example, a trigger in the form of a user input of a "<", ">", "enter", or other such command may cause the gathering of different user interface content than a trigger embedded in a media stream. It will be appreciated that these examples of context are described for the purpose of example, and are not intended to be limiting in any manner.

Method 200 next comprises, at 220, requesting a user interface content slide deck based upon the determined context of the triggering event, and, at 222, receiving a user interface content slide deck comprising one or more user interface content slides. The term "slide deck" as used herein represents a collection of "slides", or navigable pages, of user interface content that is assembled for the determined user interface context. Each slide of user interface content represents a single page of user interface content. A user may browse between slides by selecting suitable input commands.

The slides may relate to the media content being played. For example, where the media content is a movie, one slide in a slide deck may be a "Review" slide that contains text from a critical review of a movie, while another slide may be a "Related Movies" slide that contains a list of movies that are editorially considered to be similar to the current content. Another slide may be a "Biography" slide on which a user may view the biographies of one or more actors in the movie. Other examples of suitable user interface content for the slides are described in more detail below.

The slide deck received at 222 may have any suitable form. For example, in one embodiment, the slide deck received at 222 comprises the entire content of each slide in the slide deck. Alternatively, in another embodiment, the slide deck comprises a list of user interface content pointers, wherein each user interface content pointer points to a user interface content storage location at which content for a corresponding slide is stored. In this embodiment, the user interface content for each slide in a slide deck is fetched when the user requests to view that specific slide. This embodiment may provide for faster retrieval of the slide deck, and also may utilize fewer computing resources when retrieving the slide deck.

The user interface content pointers may have any suitable form. In one embodiment, each pointer comprises a universal resource indicator (URI) that gives the location at which the user interface content is stored. Examples of suitable URIs include, but are not limited to, hypertext transfer protocol URIs (e.g. http:// . . . ), res protocol URIs (e.g. res:// . . . ), file protocol URIs (e.g. file:// . . . ), uniform resource names (e.g. "urn: . . . "), etc.

A slide deck may be assembled in any manner. For example, a slide deck server (local or remote to the media player) that contains information for inclusion in a slide deck may receive the request for the slide deck and gather a list of URIs to return to the requesting media player as the slide deck. The slide deck server may determine from the request what types of content to seek, may search for user interface content URIs relevant to the context of the request, and then may return a list of relevant user interface content URIs to the requesting media player. A list of such URIs may be stored in a table, database, etc. local to the media player, or at a remote location. In this manner, the slide deck may be assembled dynamically, based upon the user interface content available at the time the request for the slide deck is made. Furthermore, a trigger may include, as context, information regarding a location at which user interface content for that trigger is stored. In this case, the media player may access the specified location to retrieve the slide deck for that context.

The slide deck server may determine what user interface content to gather and include in a slide deck for a specific context in any suitable manner. For example, the slide deck server may utilize an XML document (or other suitable filtering mechanism) that defines the content for inclusion in a slide deck for a specific context. As a simple example, a slide deck for a specific television show may be defined such that user interface content for other shows is filtered and not included in the slide deck.

Upon receiving a request, the slide deck server searches for URIs for any user interface content to be included in the slide deck based upon the triggering event context. Where user interface content is available for one or more categories of information to be included in the slide deck for that context, the URIs for the user interface content are assembled into the slide deck. Where no user interface content is available for a slide in the slide deck, that slide may be omitted from viewing, or a fallback slide may be included in its place, so that a user does not have to browse through an empty slide during use. It will be appreciated that the content of a slide or slide deck may be dynamically changed by changing the content stored at a user interface content location, and/or by adding or removing user interface content pointers from a table or database of pointers.

Furthermore, an order of slides may be dynamically changed as well. For example, a user interface may be provided at which an administrator can manipulate the order of slides in a slide deck. Likewise, slides may be added or deleted from a deck in a similar manner. Further, a URI in a slide deck may serve as a placeholder for a variable number of/order of slides such that an administrator can change the order, number, or content of slides by changing the user interface content (or an order supplemental set of user interface content pointers) stored at the placeholder URI.

User interface content for the slide deck may be obtained from any suitable source. For example, content that is specific to a media content item may be provided by the entity that produced or is broadcasting the media content item, by the media player provider, partners of these entities, etc. Other user interface content may include, but is not limited to, content related to the media type (e.g. movie, broadcast TV, broadband video clip, etc.), content related to the media item (e.g. duration, current position, etc.), and other such content.

Continuing with FIG. 2, method 200 next comprises, at 224, retrieving the user interface content for a default slide from the location specified by the default slide pointer. The user interface content for other slides than the default slide may be retrieved for each slide when the user requests to view that slide. The default slide may be a first slide in the deck, or may be another slide that is designated as the default slide. It will be appreciated that the identity of a default slide in a slide deck may change depending upon the context of the slide. Therefore, depending upon the specific context of a request for a slide deck, different slides in a slide deck may be used as a default slide even if the collection of user content in the slide deck is otherwise similar.

Method 200 next comprises, at 226, displaying to the user the default slide retrieved at 224. The default slide may be displayed in any suitable manner. For example, in one implementation, each slide may take the form of a markup document (for example, HTML, XML, XHTML, MCML (Media Center Markup Language, for use with Microsoft Windows Media Center), etc.) that defines the visual appearance of the slide, and the user interface content retrieved from the URI for a slide is incorporated as embedded (or other suitably tagged) content in the markup document. It will be appreciated that this method of displaying a slide is described for the purpose of example, and that any other suitable implementation may be used without departing from the scope of the present disclosure.

In one embodiment, the content and appearance of the default slide may be different than the content and appearance of other slides in the deck. For example, referring to FIG. 3A, where the context of the triggering event is the beginning of a new media content item (such as the beginning of a TV show, etc.), a "hinting" slide 300 may be displayed. The hinting slide may be smaller, have a different design, or otherwise be less prominent than other slides in the deck. For example, the hinting slide 300 shown in FIG. 3 extends partway across the display screen, instead of across the entire screen. The hinting slide 300 may display basic information 302 about the media content item, such as the title of the show, and also may display some indicator 304 that more information is available, such as a ">" character indicating that a user can push the ">" button on a media player controller to browse for more information.

Figure 3A:
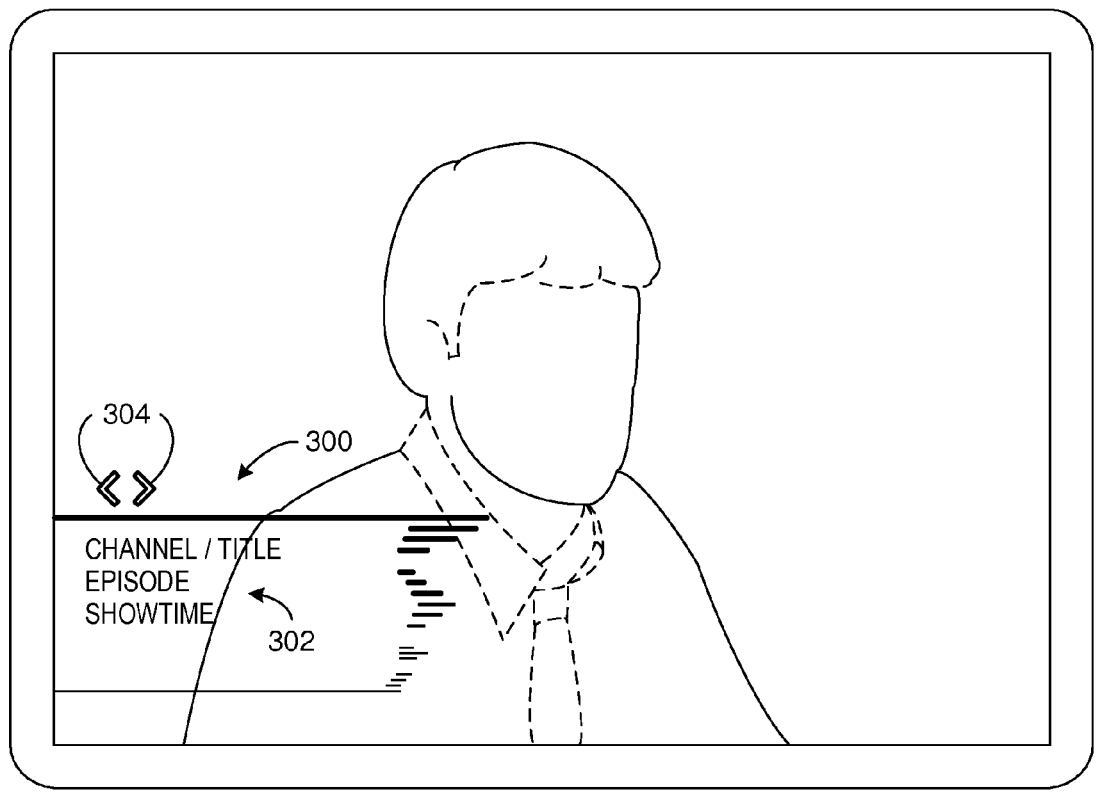
FIGS. 3A and 3B show embodiments of a hinting user interface slide and a full user interface slide.
Figure 3B:
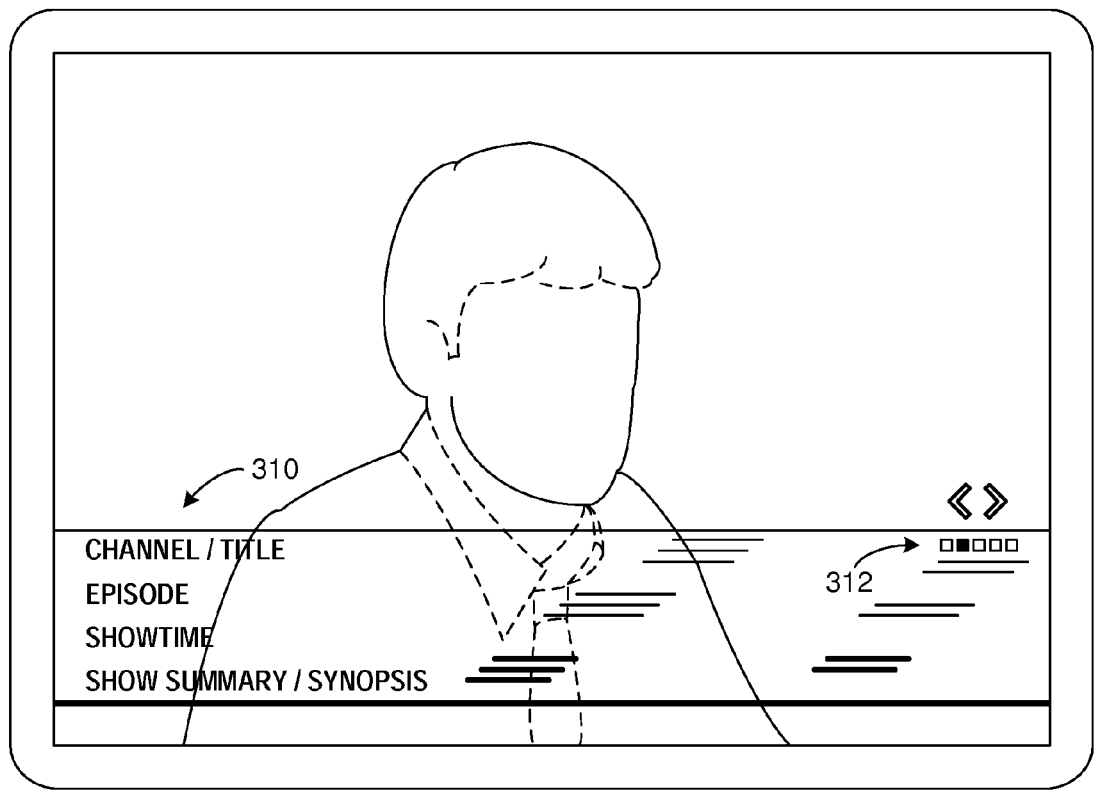

If a user selects to see more information, a full slide, shown at 310 in FIG. 3B, may be used to display additional user interface content. As depicted, the full slide 310 extends completely across the screen and contains additional information, such as an episode synopsis, not shown in the hinting slide 300. Further, the depicted full slide 310 also comprises a location indicator 312 that visually indicates which slide of the slide deck is currently being displayed. It will be appreciated that the hinting slide 300 and full slide 310 shown in FIGS. 3A and 3B are shown for the purpose of example, and that a hinting slide and full slide according to the present disclosure may have any other suitable appearances.

Continuing with FIGS. 3A and B, the slides may be displayed in any suitable relation to media content being played. For example, as depicted, the slides may be displayed as partially transparent overlays that are positioned over a portion of the media content. In one more specific implementation, the partially transparent overlays may be positioned over a bottom portion of the media content, for example, about ⅓ the height of the screen. In this configuration, a user may easily read and interact with the user interface content without the user interface obscuring or disrupting the playback of the media content in a full-screen mode. Alternatively, the slides may be displayed in any other suitable location.

Further, a degree of transparency of a slide may vary across the area of the slides. For example, the slide may comprise a background portion with less transparency where user interface content is displayed, and with more transparency in regions with no user interface content displayed. This may help to improve the viewing of the underlying media content. In alternative embodiments, the user interface content may displayed in other relations to the media content. For example, the user interface content may be displayed in a side bar or bottom bar on the screen, in an inset (or primary) picture-in-picture box, etc.

Any suitable type of user interface content may be integrated into a slide. Examples of suitable user interface content sources include, but are not limited to, local data stored in a database, table or file, streamed video/audio, broadcast video/audio, and web-hosted markup and content. The use of web-hosted markup and content may in a slide may allow interactive user interface content to be presented to a user, as indicated at 228. For example, a trigger may be received during a streaming television show that causes the request/retrieval of an interactive slide deck in which the default slide (or other slide) invites the user to interact with the show or with other users viewing the show. As a specific example, the displayed user interface content may invite a viewer to submit an answer in a game show, to vote for a favorite character on a show, etc. The user may then input an answer, which is transferred over a network to a server that collects answers submitted by viewers and returns feedback to the user, such as a correct answer to the game show question, results of a voting poll, etc. This feedback may then be displayed in the slide. It will be appreciated that this specific implementation of an interactive slide is described for the purpose of example, and that any other suitable interactive slide may be implemented in any suitable manner.

Continuing with FIG. 2, after displaying a default slide, it is next determined, at 230, whether any user input is received. For example, upon seeing a hinting slide, a user may make an input requesting to browse to a different slide to view additional information, as indicated at 232. Likewise, where an interactive slide is displayed, the user may make an input in response to a question or item presented on the interactive slide, as indicated at 234.

Where no user input is received at 230, the display of the user interface content ends after passage of a predetermined amount of time, as indicated at 236. The user interface content may be configured to fade out, to move off of a display screen via an animation, or end in any other suitable manner.

On the other hand, where a user input is received at 230, the user interface content corresponding to the different slide is retrieved from the corresponding user interface storage location at 238, and/or the user input is sent to a remote server and feedback received at 240. Then the new slide is displayed at 242, or in the case of an interactive slide, the feedback to the user input is displayed in the same slide or a new slide at 244. Method 200 loops through processes 230, 238 and 242 until no user input is received for a slide for a predetermined amount of time. Upon expiration of the predetermined amount of time without receiving a user input, method 200 concludes at 236.

Figure 4:
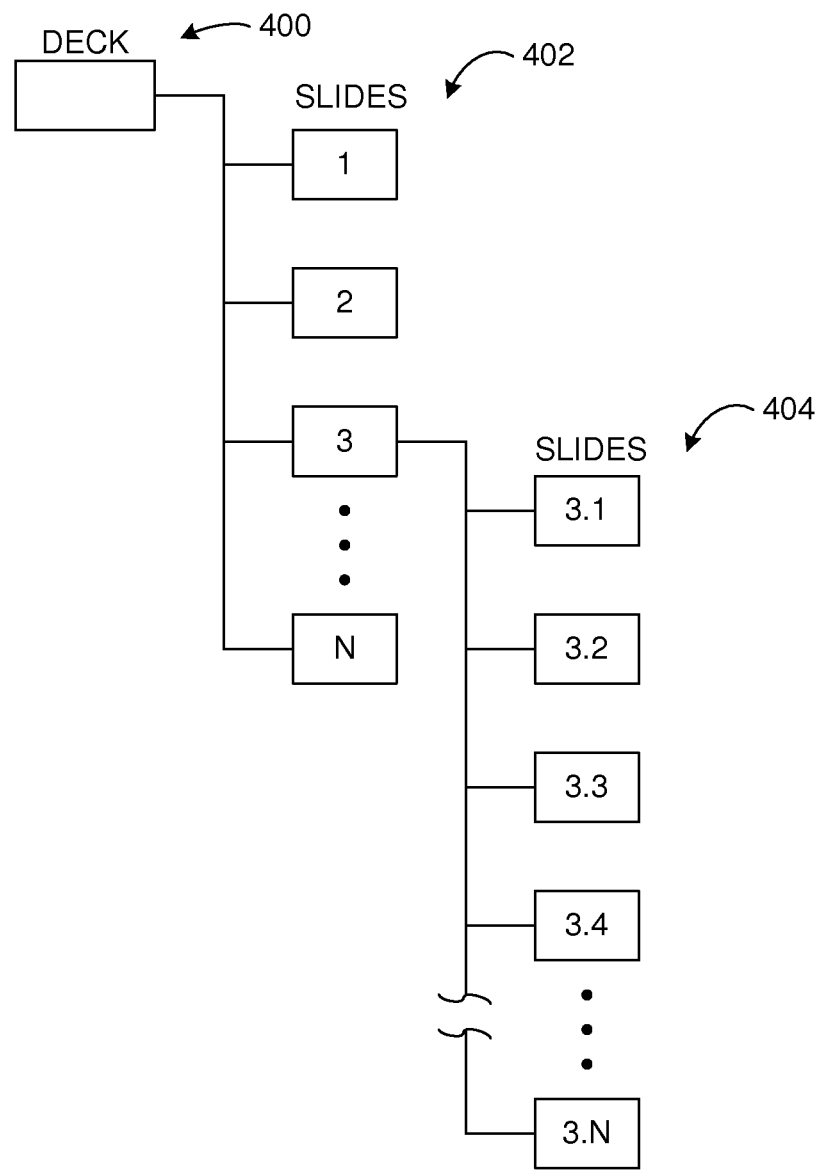
FIG. 4 shows a schematic depiction of an embodiment of a user interface content slide deck.

FIG. 4 shows a schematic representation of a slide deck 400. The slide deck 400 includes N slides 402, where N is an integer. The number of slides in a slide deck may vary depending upon the availability of content for the context for which the slide deck 400 is assembled. Each slide may comprise a URI that indicates a location at which user interface content for that slide is stored, and/or the user interface content itself. Further, in some embodiments, one or more of slides 402 may include one or more sub-slides 404. The sub-slides 404 may be retrieved at the same time the parent slide is retrieved, or alternatively, the selection of a sub-slide 404 may act as a triggering event that causes the request and retrieval of the sub-slides 404, as described above.

The display of user interface content as described herein provides a rich, extensible framework for enabling many use scenarios without disrupting playback of media content. Such scenarios may include, but are not limited to, the display of interactive content, the dynamic updating of user interface content that is specific to media content currently being played, and other such scenarios. It will be appreciated that the disclosed embodiments may also be used in any other suitable use environment and with any suitable media player. Further, various concepts disclosed herein, including but not limited to the slide deck and slide embodiments described above, may be used to deliver and present content in settings other than a media player user interface.

It will be further understood that the methods described herein may be implemented on any suitable computing device or devices, including but not limited to those shown in FIG. 1. As used herein, the term "computing device" may include any device that electronically executes one or more programs. The embodiments described herein may be implemented on one or more computing devices, for example, via computer-executable instructions or code, such as programs, stored on a computer-readable storage medium and/or in computing device memory and executed by a processor on the computing device. Generally, programs include routines, objects, components, data structures, and the like that perform particular tasks or implement particular abstract data types. The term "program", "programming" and the like as used herein may connote a single program or multiple programs acting in concert, and may be used to denote applications, services, or any other type or class of program.

It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. In a media player, a method of presenting media content and user interface content to a user, comprising:
   detecting a triggering event;
   requesting from a remote server a user interface content slide deck upon detecting the triggering event;
   receiving from the remote server the user interface content slide deck, the user interface content slide deck comprising a plurality of user interface content pointers corresponding to content for a plurality of nested user interface content slides;
   receiving from the remote server a markup document associated with the user interface content slide deck, the markup document defining a template for a visual appearance of each of the plurality of nested user interface content slides;
   in response to a user selection of a selected user interface content slide, retrieving user interface content from a location defined by a user interface pointer corresponding to the selected user interface content slide and embedding the user interface content into the markup document to format the user interface content and create the selected user interface content slide; and displaying the selected user interface content slide to a user along with the media content.

2. The method of claim 1, wherein the selected user interface content slide comprises a universal resource indicator indicating a location at which to retrieve user interface content for display in connection with the user interface content slide.

3. The method of claim 1, wherein the selected user interface slide is a first slide, and further comprising, if no user interface content is available for a second slide in the slide deck, then performing one or more of omitting the second slide from the slide deck and including a fallback slide in place of the second slide in the slide deck.

4. The method of claim 1, wherein requesting the user interface content slide deck comprises determining a context of the triggering event, and requesting the user interface content slide deck based upon the context of the triggering event.

5. The method of claim 4, wherein the context comprises one or more of information regarding a type of media content being displayed, an identity of the media content being displayed, a time of day, a date, a location within the media content at which the triggering event is received, and a nature of the triggering event received.

6. The method of claim 1, further comprising displaying the user interface content as a partially transparent overlay over the media content such that a degree of transparency of the user interface content varies across an area of the slide.

7. The method of claim 1, wherein a first slide in the slide deck is a hinting slide showing a first, lesser amount of information, and further comprising displaying another slide in the slide deck showing a second, greater amount of information upon receiving a user input while displaying the hinting slide.

8. The method of claim 1, further comprising receiving selection of a uniform resource indicator embedded within the slide, and retrieving user interface content from a location indicated by the uniform resource indicator for display in connection with the slide.

9. A computing device comprising computing device memory and instructions stored in the computing device memory that are executable to detect a triggering event;

request from a remote server a user interface content slide deck upon detecting the triggering event;

receive from the remote server the user interface content slide deck, the user interface content slide deck comprising a plurality of user interface content pointers corresponding to content for a plurality of nested user interface content slides;

receive from the remote server a markup document associated with the user interface content slide deck, the markup document defining a template for a visual appearance of each of the plurality of nested user interface content slides;

in response to a user selection of a selected user interface content slide, retrieve user interface content from a location defined by a user interface pointer corresponding to the selected user interface content slide and embed the user interface content into the markup document to format the user interface content and create the selected user interface content slide; and display the selected user interface content slide to a user along with the media content.

10. The computing device of claim 9, wherein the selected user interface content slide comprises a universal resource indicator indicating a location at which to retrieve user interface content for display in connection with the selected user interface content slide.

11. The computing device of claim 9, wherein the selected user interface slide is a first slide, and wherein the instructions are further executable to perform one or more of omitting a second slide from the user interface content slide deck and including a fallback slide in place of the second slide in the user interface content slide deck if no user interface content is available for the second slide in the user interface content slide deck.

12. The computing device of claim 9, wherein the instructions are executable to request the user interface content slide deck by determining a context of the triggering event, and requesting the user interface content slide deck based upon the context of the triggering event.

13. The computing device of claim 12, wherein the context of the triggering event comprises one or more of information regarding a type of media content being displayed, an identity of the media content being displayed, a time of day, a date, a location within the media content at which the triggering event is received, and a nature of the triggering event received.

14. The computing device of claim 9, wherein the instructions are executable to display the user interface content as a partially transparent overlay over the media content such that a degree of transparency of the user interface content varies across an area of the slide.

15. The computing device of claim 9, wherein the instructions are executable to display a first slide in the user interface content slide deck as a hinting slide showing a first, lesser amount of information, and to display another slide in the user interface content slide deck showing a second, greater amount of information upon receiving a user input while displaying the hinting slide.

16. The computing device of claim 9, wherein the instructions are executable to receive selection of a uniform resource indicator embedded within the slide, and retrieving user interface content from a location indicated by the uniform resource indicator for display in connection with the selected slide.

* * * * *